United States Patent [19]

Schertz et al.

[11] 3,708,255
[45] Jan. 2, 1973

[54] DOUGHNUT AND SHELL MAKING

[75] Inventors: Eugene P. Schertz, Wakefield; George A. Triosi, Andover, both of Mass.

[73] Assignee: Dunkin' Donuts Incorporated, Quincy, Mass.

[22] Filed: July 28, 1970

[21] Appl. No.: 58,854

[52] U.S. Cl. .................................................425/287
[51] Int. Cl. ........................... A21c 3/04, A21c 11/16
[58] Field of Search ..................... 25/8, 11–20; 31/8, 31/13, 14; 72/253–255, 261; 425/287, 288, 200, 87

[56] References Cited

UNITED STATES PATENTS

| | | | |
|---|---|---|---|
| 3,052,193 | 9/1962 | Gilmore | 107/14 E |
| 3,396,677 | 8/1968 | Adams et al. | 107/14 E |
| 3,126,842 | 3/1964 | Belshaw | 425/287 |
| 3,635,171 | 1/1972 | Schertz | 425/200 |

*Primary Examiner*—Jordan Franklin
*Assistant Examiner*—G. V. Larkin
*Attorney*—W. R. Hulbert

[57] ABSTRACT

In a continuous doughnut and shell-forming apparatus, including a dough developer, a ring-forming and shell-forming depositor, and a pump for pumping dough through the developer and depositor, the depositor is provided with a first chamber having a pair of ring-forming openings, the first chamber receiving dough from the developer and a second chamber receiving dough from the first chamber, the first chamber having dies of varied cross-section to cut-off uniform rings from non-uniform flowing dough and the second chamber having cut-off valves reciprocable past the openings to cut off shells, the valves also having an extreme position closing the openings from the first chamber, the ring-forming and shell-forming portions of the machine being operable separately or simultaneously.

14 Claims, 3 Drawing Figures

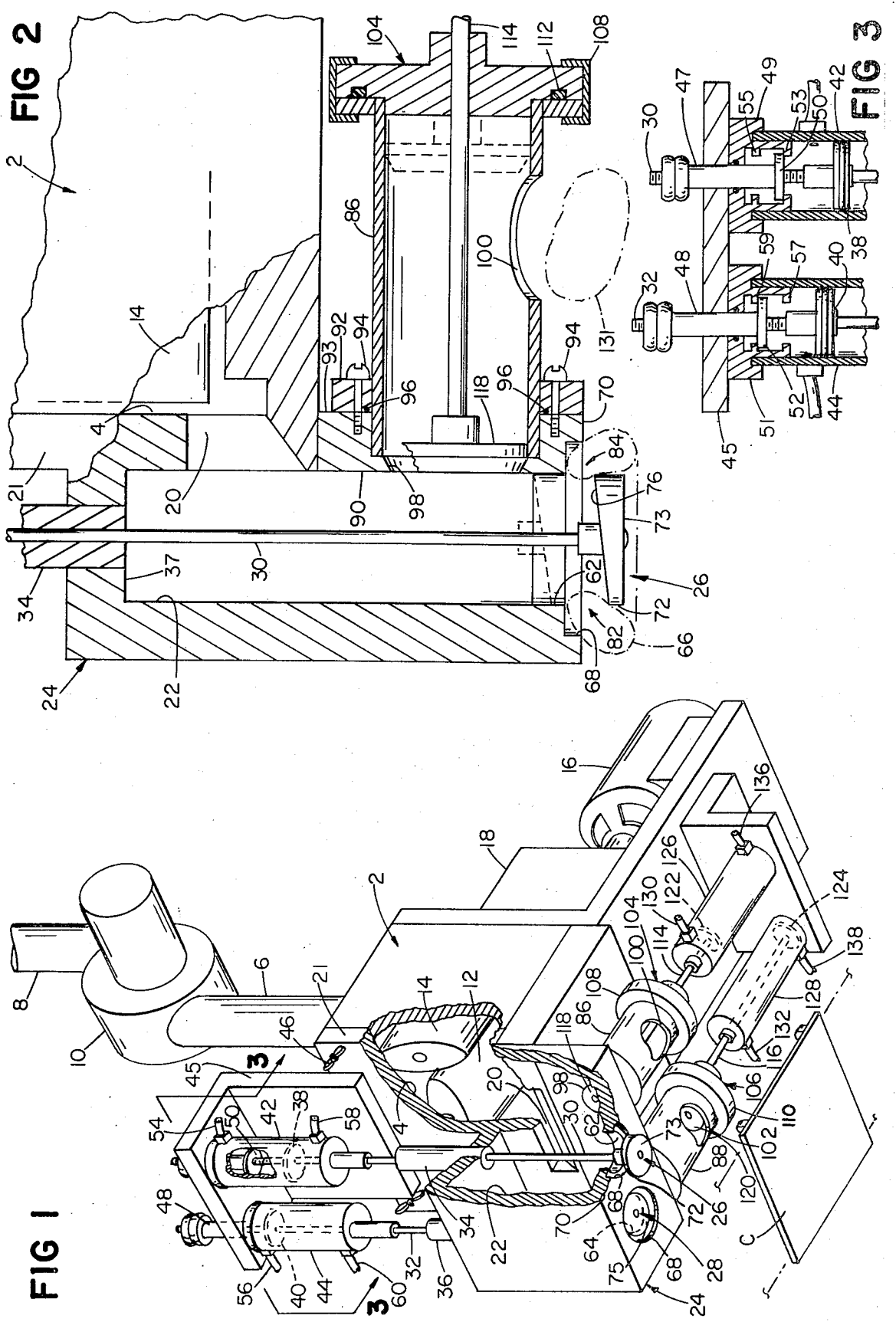

DOUGHNUT AND SHELL MAKING

This invention relates to apparatus for making doughnuts and in particular to novel and improved apparatus which selectively makes doughnut shells and/or rings and which is continuous in operation.

Continuous doughnut making apparatus, such as that disclosed in U.S. Pat. No. 3,635,171, permits the manufacture of more doughnuts with uniform size than hand cutting and is more sanitary since the dough is not touched by human or even gloved hands during the cutting operation. However, the apparatus disclosed in said patent produces only rings of dough which are then proofed, if necessary, fried and processed into ring doughnuts. In order to benefit fully from the continuous doughnut making apparatus disclosed in that application, means should be provided for producing doughnut shells, as well as rings, since shell doughnuts account for a sizable portion of the total sales of doughnuts.

Accordingly it is an object of the present invention to provide new apparatus for selective cutting of doughnut rings and/or shells that is simple, reliable, inexpensive, sanitary and automatic and which provides effective cutting of doughnut rings of different sizes and having a uniform cross-section.

The invention features, in continuous doughnut making apparatus wherein undeveloped dough is pumped through a developer and thereafter discharged from a depositor, the provision of a novel depositor, including structure which provides first and second chambers which communicate with the developer, so that dough pumped through the developer will also be pumped through the chambers. A ring-forming opening is provided in an exterior wall of one of the chambers (which for convenience will be called the ring-forming chamber) and rings of dough are discharged through such opening. The other, the shell-forming chamber, also has an opening in an exterior wall through which shells may be discharged. A die is shaped to seat in the rim of the ring-forming opening and is held by a member which extends inwardly through the opening and into the ring-forming chamber so that dough passing outwardly through the opening must pass around it and the die in annular form. The die is operated periodically to close the opening and by suitable mechanism to cut off rings as the dough discharges through the opening. The shell-forming chamber is provided with a cut-off member which is disposed to slide past the shell-forming opening to cut off the dough as it discharges through that opening into shells.

In one form of the invention the ring-forming opening is in the first chamber which is in communication with the developer to receive dough therefrom and the shell-forming opening is in the second chamber which has a dough receiving opening into the first chamber. The die holding member comprises a rod extending through the first chamber and comprising part of the die operating mechanism. The cut-off member may be in the form of a valve arranged to move into an extreme position wherein it closes the opening between the two chambers so that dough cannot pass from one to the other.

A further feature is the provision of a die of varied cross-section, so that one portion of the ring-forming opening will be closed longer than another portion to compensate for unequal speed of flow of dough through different portions of such opening and thereby to cut off uniform rings. Likewise, the outer portion of each ring-forming opening may be cut away to provide a recess which surrounds the corresponding die when it is in closed cutting position serving to prevent the cut-off ring of dough from touching and adhering to the adjacent bottom surface of the depositor. Advantageously the operating mechanism for the dies includes stops for limiting the movement in each direction of the die-holding rods, and mechanism for adjusting the relation of the stops.

In the shell-forming portion of the apparatus, the valve may be so arranged that when it is seated in closed position its inner surface is substantially flush with the inner surface of the adjacent wall of the ring-forming chamber to eliminate all dough from the chamber not in use.

In all forms of the invention, desirably the ring-forming chamber is provided by a separate housing and the shell-forming chamber is provided by at least one tube detachably mounted on the housing, the latter, in turn, being detachably mounted on the developer, so that all parts can be readily removed for cleaning. The provision of a removable closure for the outer end of the tube permits access to its interior for cleaning.

In a further modification, the structure of the invention is provided with at least two ring-forming and two shell-forming openings with individually operable die and valve operating mechanisms so that the apparatus can be used to produce all rings, all shells or some of each simultaneously, any one or more of the mechanisms being capable of being activated or deactivated at will, and, when in closed position, effectively blocking the passage of dough through the respective discharge opening.

Other objects, features and advaNtages will become apparent from the following description of a preferred embodiment of the invention, taken together with the drawings thereof, in which:

FIG. 1 is a perspective view, partly broken away, of a portion of continuous doughnut making apparatus constructed in accordance with the invention;

FIG. 2 is a longitudinal cross-section on a slightly larger scale of the ring and shell cutter; and FIG. 3 is a sectional view of the upper end portions of the cylinders which operate the ring cutters as indicated generally by the lines 3—3 of FIG. 1.

In the drawings, FIG. 1 shows the general organization of the apparatus and the relationship of the improvements of the invention thereto. The same includes a developer indicated generally at 2 providing a chamber 4 into which the undeveloped dough, or dough-making ingredients, are admitted through a pipe 6. The ingredients, including flour, water, yeast or baking powder are initially mixed in a suitable mixing apparatus (not shown) from which they are continuously advanced through a pipe 8 to pump 10 which propels the mixture through the pipe 6, developer 2 and the ring-forming portion 24 of the depositor. As apparatus for continuously processing dough making ingredients through the development stage for the purpose of making doughnuts is known in the art, as shown for example in said U.S. Pat. No. 3,635,171, only so much of the apparatus as is necessary to show the relationship of the invention to the developer has been shown. Inside the developer chamber 4 are two paddles 12, 14 supported for rotation on horizontal shafts and driven by a motor 16 through suitable reduction gearing 18. In the chamber 4 either the dough-making ingredients, or dough, move under the influence of the pump 10 downwardly past the paddles 12, 14 and out of the chamber 4 through a passageway 20 in the developer front wall 21. In the developing chamber 4 the dough is worked by the paddles 12, 14 to a suitably developed condition, if development of the particular dough is required.

From the passageway 20 the developed dough enters the ring-forming chamber 22. In the chamber 22 the developed dough continues to be maintained under pressure by the pump 10. The developed dough leaves the ring-forming chamber through suitable openings 62, 64 in its bottom in the form of rings in the general shape of doughnuts, ready to be proofed, if proofing is needed. For this purpose a pair of vertically movable cutters or dies 26, 28 are provided. The cutters 26, 28 are carried on stems 30, 32 respectively, which stems are vertically slidable in sleeves 34, 36 in the upper wall 37 of the chamber 22. As seen in FIG. 3, stems 30, 32 are secured to and extend upwardly beyond piston heads 38, 40 (in individually operable pneumatic cylinders 42, 44 mounted on support 45 which is fixed to removable side wall 21 of developer 2 which is held in place by wing nuts 46) and are threaded through rotatable connectors 47, 48 mounted in an air-tight manner on the upper ends 49 and 51 of cylinders 42, 44. Flange members 50 and 52 are both slidable between two stops 53, 55 and 57, 59 on the inner surfaces of cylinders 42 and 44. A remote sensing unit (not shown) located, for example, on a proofing conveyor actuates an air supply having a valve switching arrangement and timers which provide air through any two of conduits 54, 56 (to drive piston heads 38, 40 downward) 58 and 60 (to drive piston heads 38, 40 upward). Cutters 26, 28 are thus reciprocated vertically between positions within the openings 62, 64 in the bottom wall of the depositor 24 (as cutter 28 is shown in FIG. 1) to a position below the openings 62, 64 (as cutter 26 is shown in FIG. 1) permitting dough under the pressure of pump 10 to issue through the openings in the form of a cylinder surrounding each die 26, 28. As the die is lifted by its rod into its corresponding opening it cuts off the cylinder of dough to form a ring 66 (FIG. 2) of dough, generally in the shape of a doughnut, which is deposited on a suitable doughnut carrier C. The bottom wall of the structure forming the ring-forming chamber is cut away around each opening 62, 64 to form recesses (68 in FIG. 2) having a greater diameter than that of openings 62 and 64 disposed immediately below such openings to permit dies 26, 28 to cut rings without dough adhering to the bottom 70 of the device.

As is best seen in FIG. 2, the vertical surface 72 of cutter 26 is perpendicular to the bottom surface 73. The corresponding surface (not sown) of cutter 28 is similarly perpendicular to the surface 75. The top surface 76 of cutter 26 as well as the corresponding top surface (not shown) of cutter 28 are both sloped downwardly (shown exaggerated in FIG. 2) at approximately 4 percent from the horizontal from rear to front of chamber 22. As dough under pressure advances through exit passageway 20 from developer 2, the dough stream which flows toward front wall of the chamber 22 must split and pass around stems 30, 32 and then rejoin into a single stream before passing downwardly through the forward half 82 of the cutter opening. As a result, the flow rate of the dough in the rear half 84 is greater than that in forward half 82 and, were top surfaces of the cutters 26, 28 horizontal, more dough would flow through rear half 84 of the cutter opening than the forward half 82 in a given time period and rings 66 would have a non-uniform cross-section. The non-uniform cross-sections of the cutting dies cause the rear portion 84 of each opening to be closed longer during each cycle than the front portion 82, thus compensating for the unequal flow speed of the dough and producing rings of uniform cross-section.

The shell-forming portion of the depositor comprises identical cylindrical tubes 86, 88 mounted as shown in FIG. 2 in bores in rear wall 90, spaced slightly above openings 62, 64. In each a flange 92 (FIG. 2) fixed to each tube 86, 88 lies flat against the outer surface 93 of wall 90 when the tube is fully seated in the bore and this flange is held in place by removable cap screws 94 thereby to detachably secure the tubes 86, 88 in place. O-rings 96 are provided to insure a tight seal between the tube and the adjacent wall. Counterbores 98 establish communication between the interior of the ring-forming chamber 22 and the interiors of the tubes 86, 88, which comprise secondary depositor chambers, whereby the developed dough under the pressure of the pump 10 may flow into the tubes 86, 88. Openings 100, 102 in the respective lower sides of tubes 86, 88 adjacent but spaced from their outer end are shaped to provide exits for the dough in the form of shells from the tubes 86, 88.

Tubes 86, 88 are provided at their outer ends with closure members 104, 106 detachably secured in any suitable manner such as spring clips 108, 110, an O-ring 112 being provided in each to assure a tight seal between the closure members 104, 106 and the respective tubes 86, 88. The closure members 104, 106 are provided with central bores through which pass plungers 114, 116 respectively carrying on their inner ends valves 118 and 120 (only valve 118 is shown in FIG. 2) of the appropriate size and shape to fit snugly against the interior surface of the tubes 86, 88 and to seat in the valve seat provided by the counterbore 98, which may be provided with cylindrical and conical portions.

Plungers 114 and 116 extend through the central bores in closure members 104 and 106 to piston heads 122 and 124 respectively, in pneumatic cylinders 126 and 128 with fixed ends mounted on supporting frame 112. Piston heads 122 and 124 are selectively actuated with suitable control switches and timers for reciprocal movement by air flowing in conduits 136, 138 and 130, 132 between innermost positions in which valves 118, 120 are seated against their respective valve seats and outermost positions in which valves 118, 120 are disposed between openings 100, 102 and closure members 104, 106 to permit dough to issue from openings 100, 102. When sufficient dough has issued from openings 100, 102, the timers actuate the pneumatic controls to return valves 118, 120 to their innermost position and valves 118, 120 cut the dough into shells 131 which are deposited on a doughnut carrier.

In operation, dies 26 and 28 may be actuated to cut two doughnut rings 66 simultaneously; valves 118 and 120 may be actuated to cut two shells simultaneously; or one of dies 26, 28 and one of valves 118, 120 (preferably that valve adjacent the closed die) may be activated to cut one ring and one shell substantially simultaneously. In all cases the deposited rings and/or shells fall onto the carrier C and are taken away for further processing. Simple selector switches may be employed to change from one mode of operation to another without disturbing the continuous operation of the apparatus. Connectors 47 and 48 may be rotated to adjust the fully closed and fully open position of dies 26, 28 and thereby vary the size of the rings 66 or to compensate for speed of flow of the dough. The use of separate pneumatic cylinders 42, 44 with piston heads 38, 40, rather than a single cylinder and yoke as described in the referenced Schertz application, to move stems 30, 32 permits more uniform longitudinal movement of stems 30, 32 and substantially eliminates sidewise movement of the stems 30, 32 as the dies 26, 28 move out of openings 62, 64, thus contributing to uniformity in the cross-section of rings 66. Valves 118, 120 in their closed positions are substantially flush with rear wall 90 of depositor chamber 22 and thus return substantially all unused dough to the chamber 22 after shell cutting operations are completed, avoiding spoiling or hardening of dough within chambers 86, 88. The easy removability of closure members 104, 106, tubes 86, 88 and the front wall 21 of developer 2 facilitates easy and complete cleaning of the entire ring and shell cutting apparatus, thus contributing to maintenance of a high level of sanitation.

What is claimed is:

1. In continuous doughnut making apparatus wherein undeveloped dough is pumped through a developer and thereafter discharged from a depositor, the improvement wherein said depositor comprises structure providing a first chamber and a second chamber, said chambers being in communication with the developer to receive dough therefrom so that dough may pass into said chambers from said developer, said structure providing at least one ring-forming opening in a wall of a chamber thereof for discharging doughnut rings therethrough and at least one shell-forming opening in a wall of the other chamber for discharging shells therethrough, a die shaped to seat in the rim of said ring-forming opening, held by a member extending inwardly through said opening into its chamber and mounted for movement between an open position wherein dough can pass around said member and flow outwardly through said opening in annular form and a closed position wherein said die cuts off said dough in the form of a ring, mechanism for operating said die, a cut-off member movable within said other chamber past said shell-forming opening to cut off shells as it is moved in one direction and to permit additional dough to pass therethrough when it is moved past said shell-forming opening in the other direction, and mechanism for operating said cut-off member.

2. The combination of claim 1 wherein the ring-forming opening is in the first chamber and the shell-forming opening is in the second chamber and said die holding member comprises a rod passing through the first chamber and forming part of the die operating mechanism.

3. The combination as claimed in claim 1 including a passageway from said developer to said first chamber and an opening between said chambers and wherein said first chamber comprises the ring-forming chamber and said second chamber comprises the shell-forming chamber, the dough passing through said first chamber to said second chamber.

4. The combination as claimed in claim 3 wherein said cut-off member is in the form of a valve fitting the opening between said two chambers and adapted when closed to prevent the passage of dough from the first to the second chamber.

5. The combination of claim 1 wherein said die has a varied cross-section to compensate for unequal speed of flow of dough through different portions of said ring-forming opening.

6. The combination of claim 1 wherein the outer portion of the rim of each ring-forming opening is cut away to provide a recess which surrounds the corresponding die when it is in closed position, serving to prevent the cut-off ring of dough from adhering to the adjacent bottom surface of the depositor.

7. The combination of claim 2 including stops for limiting the movement in each direction of said die-holding rod, and mechanism for adjusting the relation of said rod to said stops.

8. The combination of claim 4 wherein the inner surface of said valve is substantially flush with the inner surface of the adjacent wall of said first chamber when said valve is in its closed position so that movement of said valve to its closed position will empty said second chamber.

9. The combination of claim 1 wherein said structure comprises a housing providing one of said chambers and at least one tube detachably mounted on said housing providing the other chamber.

10. The combination of claim 9 wherein each tube is provided with a removable closure at its outer end.

11. The combination of claim 9 wherein said housing is detachably mounted on the developer.

12. The combination of claim 1 wherein said structure is provided with at least two ring-forming openings and at least two shell-forming openings and corresponding die and valve operating mechanisms, whereby said apparatus can produce either all shells or all rings or some of each simultaneously.

13. The combination of claim 12 wherein the die and valve operating mechanisms are each individually operable so that any one or more can be inactivated or activated independently of the others.

14. In a continuous doughnut making apparatus wherein dough is pumped first through a developer wherein it is developed and thereafter through the chamber of a depositor and out through an opening therein in the form of rings of developed dough cut off by the cyclic coaction of a cutting die wit the rim of the opening at flow rates which vary in different portions of the chamber and the opening, the improvement wherein said die has a dimension in the direction of dough travel which is greater in the portion of higher flow rate of dough than the corresponding dimension in the portion of slower flow rate of dough so that the portion of said opening of higher flow rate will remain closed by said die for a longer period of time in each cycle than the other portion to compensate for the unequal flow rate of the dough through different portions of said opening and thereby to produce rings of uniform cross-section.

* * * * *

UNITED STATES PATENT OFFICE
CERTIFICATE OF CORRECTION

Patent No. 3,708,255          Dated January 2, 1973

Inventor(s) Eugene P. Schertz and George A. Troisi

It is certified that error appears in the above-identified patent and that said Letters Patent are hereby corrected as shown below:

In inventor's name, "Triosi" should be --Troisi--;

Column 1, line 17, "application" should be --patent--;

Column 5, line 18, "application" should be --patent--; and,

Column 6, line 62, "wit" should be --with--.

Signed and sealed this 29th day of May 1973.

(SEAL)
Attest:

EDWARD M. FLETCHER, JR.          ROBERT GOTTSCHALK
Attesting Officer                Commissioner of Patents